United States Patent [19]

Ausherman

[11] 3,927,679

[45] Dec. 23, 1975

[54] THRESHING CYLINDER AND RASP BAR THEREOF

[76] Inventor: William S. Ausherman, 615 K St., Belleville, Kans. 66935

[22] Filed: July 24, 1974

[21] Appl. No.: 491,326

Related U.S. Application Data

[63] Continuation of Ser. No. 140,380, May 5, 1971, abandoned.

[52] U.S. Cl. ............................................ 130/27 HA
[51] Int. Cl.² ........................................... A01F 12/22
[58] Field of Search ................................. 130/27 HA

[56] References Cited
UNITED STATES PATENTS

| | | | |
|---|---|---|---|
| 1,853,784 | 4/1932 | Stevens | 130/27 HA |
| 2,256,010 | 9/1941 | Ausherman | 130/27 HA |
| 2,283,402 | 5/1942 | Welty | 130/27 HA |

*Primary Examiner*—Russell R. Kinsey
*Attorney, Agent, or Firm*—Robert E. Breidenthal

[57] ABSTRACT

A threshing cylinder including a plurality of toothed rasp bars, each of which is of strictly integral construction that includes a portion rotationally forward of the teeth that is radially inwardly inclined, with the rotationally forward ends of each tooth being sharp and of substantial height.

2 Claims, 6 Drawing Figures

INVENTOR.
WILLIAM S. AUSHERMAN
BY
Robert E. Breidenthal

THRESHING CYLINDER AND RASP BAR THEREOF

This is a continuation of application Ser. No. 140,380, filed on May 5, 1971, and now abandoned.

The present invention relates to new and useful improvements in threshing cylinders and particularly pertains to threshing cylinders incorporating a new and useful rasp bar.

The present invention constitutes improvements on threshing apparatus such as shown in my U.S. Pat. No. 3,256,887, entitled Rasp Bar For A Threshing Cylinder, which issued June 21, 1966, and as shown in U.S. Pat. No. 2,796,868, entitled Combine Cylinder, which issued to Oliver on June 25, 1957.

There are extant cylinder and concave combinations which in operation are somewhat deficient in the amount of suck or draw provided. Such deficiency is at least in part due to the fact that neither the rasp bar nor associated structure includes "wind control elements," that is, structure movable with the rasp bar and rotationally in advance of the rasp bar teeth that deflects air and the material being threshed radially outward toward the teeth. Unfortunately, such extant combinations are not susceptible to correction of such deficiency due to lack of deflecting or wind control elements by replacing the rasp bars of the extant combinations with the rasp bars and wind control elements or curved backing plates of the character shown in the aforementioned patents because of dimensional limitations imposed by the extant combinations. Specifically, such attempted replacement results in the radial dimension of the cylinder becoming inoperably excessive, even when the radial thickness of the two-part rasp bar replacement assembly is reduced as much as practicable.

Accordingly, an important object of the present invention is to provide a rasp bar which can be provided as a replacement in extant cylinder and concave combinations, without exceeding the radial dimensional limitations imposed by such extant combination and yet substantially improve the suck or draw of the cylinder.

Another important object of the invention is to provide a rasp bar and deflecting combination that enables an economy of material used in such combination while realizing an increase in the strength of the combination relative to radial loads imposed thereon during rotation.

Yet another important object of the invention is to provide a rasp bar and deflecting combination that is less expensive to manufacture and which can be more easily installed in or removed from a threshing cylinder in less time.

Still another important object of the invention resides in providing an integral or one-piece rasp bar and deflecting combination, whereby it is unnecessary that separate parts must be provided having mating surfaces and whereby a forwardly facing shoulder at the base of the forward edges of the teeth, which can subject some grain to an increased likelihood of being cracked, is not a virtual casting necessity.

A broad aspect of the invention involves a rasp bar and deflection plate combination comprising an elongated web having a lateral extent defined by contiguous forward and rear portions thereof having an integral junction, said rear portion having a substantially horizontal upper surface, said forward portion having an upper surface constituting a forward continuation of the upper surface of the rear portion and which is inclined downwardly and forwardly therefrom, and a longitudinally extending row of upstanding teeth on and integral with the rear portion of the web, with each of said teeth extending substantially the entire transverse extent of the rear portion of the web and being inclined at an acute angle with respect to the longitudinal extent of the web and having a forward end portion, said forward end of the tooth projecting upwardly from the web and being disposed adjacent the juncture of the forward and rear portions of the web, said forward end portion of the tooth being beveled to present an upstanding sharp edge that faces forwardly, said teeth of the row of teeth being parallel to each other in their transverse extent across the rear portion of the web, and said forward portion of the web having an inclined transverse extent greater than one half the horizontal transverse extent of the rear portion of the web.

Another aspect of the invention involves a threshing cylinder having a direction of rotation comprising a plurality of mounting plates spaced along and extending radially from the axis of the cylinder, an even numbered plurality of elongated rasp bars circumferentially equally spaced about and equidistant from said axis, with said rasp bars being parallel to said axis, each of said mounting plates having radial extremities engaging the rasp bars, and means detachably securing the rasp bars to the radial extremities of the plates, each of said rasp bars comprising an elongated web having a lateral extent defined by contiguous first and second portions thereof having an integral junction, said first portion trailing the second portion with respect to the direction of rotation of the cylinder and having a radially outward surface substantially normal to a radial line from the web to the axis of the cylinder, said second portion of the web having a radially outward surface constituting a forward continuation of the surface of the first portion and which is inclined radially inwardly and forwardly therefrom with respect to the direction of rotation of the cylinder, and a longitudinally extending row of teeth integral with the first portion of the web, said teeth projecting radially outward from the radially outward surface of the first portion of the web, with each of said teeth extending substantially the entire transverse extent of said first portion of the web and being inclined at an acute angle with respect to the longitudinal extent of the web and having a forward end portion with respect to the direction of rotation of the cylinder, said forward end portion of the tooth projecting radially outward from the web and being disposed adjacent the juncture of the first and second portions of the web, said forward end portion of the tooth being beveled to present a radially outward extending sharp edge that faces forwardly with respect to the direction of rotation of the cylinder, said teeth of each row being parallel to each other, with the rows of teeth of circumferentially adjacent rasp bars being oppositely inclined.

Other objects and important aspects of the invention as well as important features and advantages of the same will become manifest during the ensuing description of a preferred embodiment thereof, such description being given in conjunction with the accompanying drawing, wherein.

Figure 1:
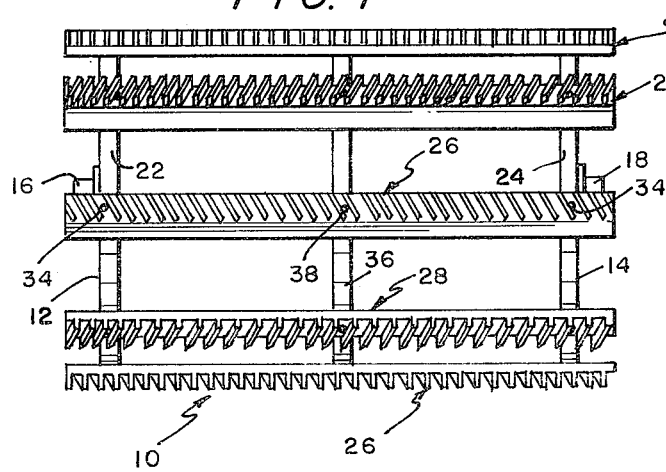
FIG. 1 is a side elevational view of the threshing cylinder.
Figure 2:
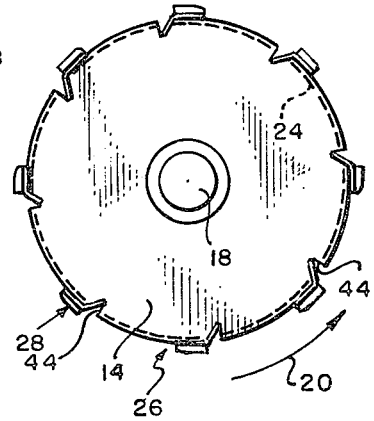
FIG. 2 is an end view of the threshing cylinder, with the hidden flanges on the mounting discs being shown in dashed outline.

Referring to the drawings, the reference numeral 10 designates the threshing cylinder generally, the same being comprised of a plurality of parallelly spaced and generally circular mounting plates or disks 12 and 14, with the endmost plates 12 and 14 having centrally fixed thereto a pair of axially and oppositely extending trunnions 16 and 18 by means of which the cylinder 10 can be conventionally mounted for rotation in the direction indicated at 20.

The outer peripheries of the mounting plates 12 and 14 are flanged as shown at 22 and 24.

Two forms of rasp bars designated generally at 26 and 28 are provided and such rasp bars are disposed about and engage the plates 12 and 14. The rasp bars 26 and 28, which are elongated as shown, are circumferentially spaced uniformly about the axis of the cylinder defined by the trunnions or axles 16 and 18. In addition, the rasp bars are parallel to and uniformly spaced from the axis of the threshing cylinder 10, with an even number of the rasp bars of the two types 26 and 28 being alternated circumferentially about the cylinder 10.

The rasp bars 26 and 28 are provided with internally threaded openings, such as indicated at 30 and 32, by means of which threaded bolts, such as those indicated at 34 are extended radially outward through suitable openings, not shown, in the flanges 22 and 24 to threadingly secure the rasp bars 26 and 28 to the mounting plates or discs 12 and 14.

Preferably another flanged mounting disc 36 is provided that is similar to the discs 12 and 14, and the rasp bars 26 and 28 are similarly secured to the disc 36 by means of bolts 38. If deemed necessary or expedient, an axle, not shown, can extend centrally through the disc 36 and be suitably secured to the discs 12, 14 and 36 as will be evident to those familiar with threshing cylinders. The rasp bars 26 and 28 include wind control or deflecting portions 40 and 42, and the discs 12, 14 and 36 have their outer peripheries notched as indicated at 44 to accommodate such portions 40 and 42 as the latter are radially inwardly and forwardly inclined.

The rasp bar 26 comprises an elongated web designated generally at 46 that includes the previously mentioned forward portion 40 and a rear portion 48. The web portions 40 and 48 are integral with each other, and can each be substantially flat and of substantially equal thickness as shown.

The rasp bar 26 is oriented so that the radially outward or upper surface 50 thereof is substantially perpendicular or normal to a line therefrom to the axis of the cylinder 10. The radially outward or upper surface 52 of the forward web portion 40 constitutes a forward and inclined continuation of the surface 50, with the surfaces 50 and 52 preferably merging smoothly as shown at 54 at the junction 56 of the web portions 48 and 40. The surfaces 50 and 52 jointly define a dihedral angle in the range of about 210° to about 240°, preferably about 220°.

The rasp bar 26 includes a longitudinally extending row of spaced teeth 58 that project upwardly or radially outwardly. The teeth 58 are integral with the rear web portion 48, and have a substantial and nearly uniform height throughout their transverse extent across the rear web portion 48. As clearly shown in the drawings, the teeth 58 are parallel to each other and are inclined to the longitudinal dimension of the rasp bar by an acute angle.

The rear ends 60 of the teeth 58 are substantially coincident with the rear edge 62 of the rear web portion 48, and the forward end portions 64 of the teeth 58 are disposed at or closely adjacent to the juncture 56 of the web portions 48 and 40, though not necessarily, slightly to the rear of the junction 56.

The forward end portion 64 of each tooth 38 is bevelled at 66 in a direction opposite the inclination of the tooth to define a forwardly facing wedge shape 68 having an upstanding sharp edge 70 that extends upward or radially outward from the surface 50 to the top or radially outermost extremity of the tooth. The sharp edge 70 is preferably nearly perpendicular to the surface 50, as it is desired that the teeth 58 be of full height adjacent the junction 56. Notwithstanding such preference, the sharp edge 70 can be inclined rearwardly from the vertical as much as about 45°.

The teeth 58 are of substantial and approximately uniform height above the rear web 48 throughout their transverse extent across the latter, and can terminate in a radially outermost edge conformable to an arc about the axis of the cylinder 10.

Figure 3:
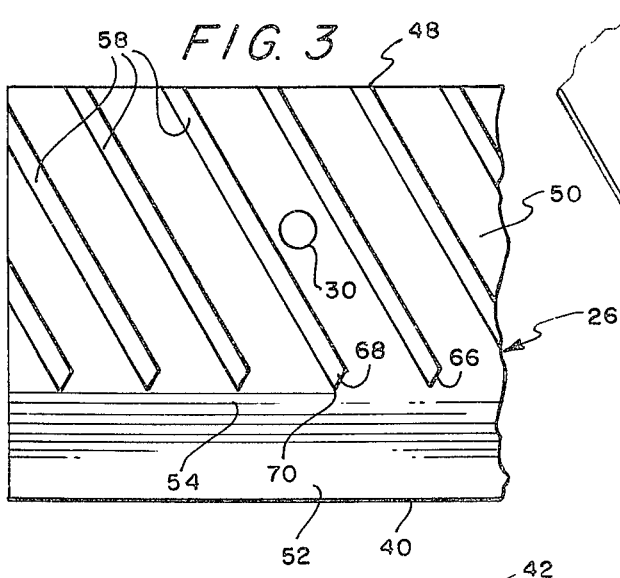
FIG. 3 is an enlarged fragmentary elevational view of an end portion of one of the rasp bars.
Figure 6:
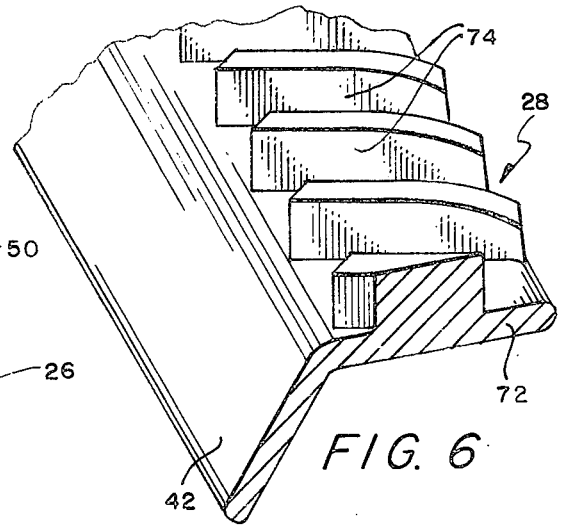
Figure 5:
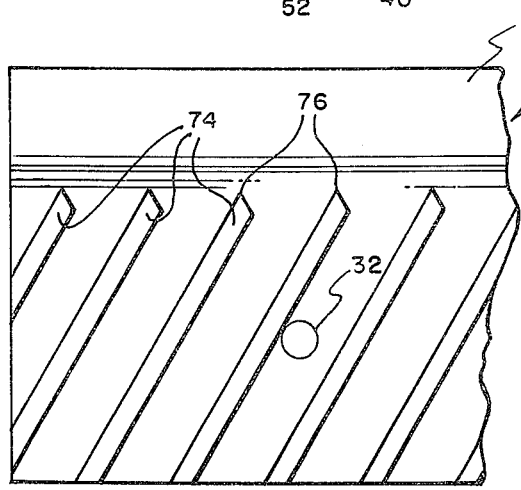
FIG. 5 is an enlarged fragmentary elevational view of an end portion of a rasp bar that differs from that shown in FIG. 3 in the direction of inclination of the teeth; and, FIG. 6 is a fragmentary isometric view of the rasp bar shown in FIG. 5, such view being transversely sectioned.
Figure 4:
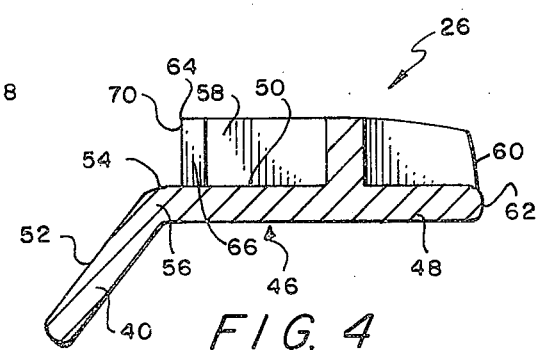
FIG. 4 is a vertical transverse sectional view of the rasp bar shown in FIG. 3.

The rasp bar 28 is, as apparent on comparing FIGS. 3 and 5, similar to the rasp bar 26, and indeed is a mirror image thereof. The forward portion 42 of the rasp bar 28 corresponds to the rasp bar portion 40. The rasp bar 28 includes a rear web portion 72, teeth 74 and sharp edges 76 that respectively correspond to the previously described elements 48, 58 and 70. The only real difference is that the teeth 74 are inclined in a direction opposite to that of the teeth 58.

The integral or one-piece construction of the rasp bars 26 and 28 has been mentioned and is again stressed. It is to be noted that the form of each of the rasp bars 26 and 28 is such that it can be readily made by casting as well as by rolling or forging from a steel. The rasp bars 26 and 28 are preferably cast ductile iron, also known as pearlite malleable. The hardness of the rasp bars or at least the teeth thereof are preferably from about 180 to about 240 Brinell.

The integral construction produces several important advantages. The thickness of the metal underlying the teeth is substantially less than if a backing plate must underlie a conventional rasp bar in order to provide the wind control or deflecting feature served in the instant case by the forward web portions 40 and 42. This reduction in thickness enables the rasp bars 26 and 28 to be used as replacements on extant cylinders, when except for such reduction they could not be used.

For a given thickness of metal underlying the teeth, the greatest strength useful for carrying loads due to rotation is realized when such metal is integral and not made up of superposed separate layers of metal. In other words, the rasp bars 26 and 28 can resist a much greater bending moment, and the integral forward and inclined web portion substantially contributes to this strength.

Combining a conventional rasp bar with a backing plate of the deflector type results in a forwardly facing shoulder at the forward edge of the conventional rasp bar that may impact upon grain so as to crack the latter. Casting a rasp bar with a sufficiently thin forward edge to avoid this possibility is difficult if not impossible.

The cost of making a single casting rather than a casting and a backing plate is obviously less, and less time and effort is required to install or remove a single than a two-part construction.

The opposite direction of inclination of the teeth of the alternated rasp bars 26 and 28 contributes to a uniform axial distribution of material passing by the threshing cylinder.

The forward web portions 40 and 42 of the rasp bars 26 and 28 constitute wind control or deflecting elements that urge the material to be threshed radially into a position to be engaged by the teeth and cooperate with the teeth to increase the draw or suck of the threshing cylinder and concave (not shown) combination.

The substantial height of the teeth at their forward ends contributes to the bite of the cylinder 10 and to the suck or draw, and it will be noted that the height of the teeth at their forward ends is within the range of about 15% to about 55% of the transverse extent of the forward web portions 40 and 42.

Attention is now directed to the appended claims.

I claim:

1. A threshing cylinder having a direction of rotation comprising a plurality of mounting plates spaced along and extending radially from the axis of the cylinder, an even numbered plurality of elongated rasp bars circumferentially equally spaced about and equidistant from said axis, with said rasp bars being parallel to said axis, each of said mounting plates having radial extremities engaging the rasp bars, and means detachably securing the rasp bars to the radial extremities of the plates, each of said rasp bars consisting of a toothed and elongated web having a lateral extent that is entirely and solely defined by contiguous first and second portions thereof having an integral junction, said first portion trailing the second portion with respect to the direction of rotation of the cylinder and having a radially outward surface that is throughout its entire lateral extent substantially normal to a radial line from the web to the axis of the cylinder, said second portion of the web having a radially outward surface of approximately planar configuration constituting a merging forward continuation of the surface of the first portion and which is inclined throughout its entire lateral extent substantially both radially inwardly and forwardly therefrom with respect to the direction of rotation of the cylinder, and a longitudinally extending row of teeth integral with the first portion of the web, said teeth projecting radially outward from the radially outward surface of the first portion of the web, with each of said teeth extending substantially the entire transverse extent of said first portion of the web and being inclined at an acute angle with respect to the longitudinal extent of the web and having a forward end portion with respect to the direction of rotation of the cylinder, said forward end portion of the tooth projecting radially outward from the web and being disposed adjacent the juncture of the first and second portions of the web, said forward end portion of the tooth being beveled to present a radially outward extending sharp edge that faces forwardly with respect to the direction of rotation of the cylinder, said teeth of each row being parallel to each other, with the rows of teeth circumferentially adjacent rasp bars being oppositely inclined, said first and second portions of the web being substantially flat and of substantially equal thickness with the radially outward surfaces thereof jointly defining a dihedral angle in the range of about 210° to 240°, and said forward end portions of the teeth projecting radially outward from the radially outward surface of the first portion of the web a distance that is in the range of about 15% to 55% of the transverse extent of radially outward surface of the second portion of the web, said rasp bar being defined entirely and solely by said toothed first portion and by said second portion of said web.

2. A rasp bar and deflection plate combination consisting of a toothed and elongated web having a lateral extent defined entirely and solely by contiguous forward and rear portions thereof having an integral junction, said rear portion having a substantially horizontal upper surface, said forward portion having an upper surface of approximately planar configuration constituting a forward smoothly merging continuation of the upper surface of the rear portion and which is inclined downwardly and forwardly therefrom for its entire lateral extent, and a longitudinally extending row of upstanding teeth on and integral with the rear portion of the web, with each of said teeth extending substantially the entire transverse extent of the rear portion of the web and being inclined at an acute angle with respect to the longitudinal extent of the web and having a forward end portion, said forward end of the tooth projecting upwardly from the web and being disposed adjacent the juncture of the forward and rear portions of the web, said forward end portion of the tooth being beveled to present an upstanding sharp edge that faces forwardly, said teeth of the row of teeth being parallel to each other in their transverse extent across the rear portion of the web, and said forward portion of the web having an inclined transverse extent greater than one half the horizontal transverse extent of the rear portion of the web, said forward and rear portions of the web being substantially flat and of substantially the same thickness, with said upper surfaces of said portions jointly defining a dihedral angle of about 210° to about 240°, and said forward end portions of the teeth projecting upwardly from the rear portion of the web a distance that is in the range of about 15% to about 55% of the inclined transverse extent of the forward portion of the web, said rasp bar and deflection plate combination being defined entirely and solely by said forward portion and said toothed rear portion of the web.

* * * * *